(12) United States Patent
Bragulla et al.

(10) Patent No.: US 7,340,738 B2
(45) Date of Patent: Mar. 4, 2008

(54) TIME OPTIMIZED REPLACEMENT OF A SOFTWARE APPLICATION

(75) Inventors: Jürgen Bragulla, München (DE); Dietmar Krauss, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 10/433,998

(22) PCT Filed: Jan. 11, 2002

(86) PCT No.: PCT/EP02/00227

§ 371 (c)(1), (2), (4) Date: Dec. 1, 2003

(87) PCT Pub. No.: WO02/057915

PCT Pub. Date: Jul. 25, 2002

(65) Prior Publication Data

US 2004/0078793 A1  Apr. 22, 2004

(30) Foreign Application Priority Data

Jan. 19, 2001 (EP) .................................. 01101277

(51) Int. Cl.
*G06F 9/445* (2006.01)

(52) U.S. Cl. ...................... 717/174; 717/168; 717/171; 717/176; 709/201; 709/203

(58) Field of Classification Search ........ 717/168–178; 709/201, 203
See application file for complete search history.

(56) References Cited

U.S. PATENT DOCUMENTS

| 5,008,814 | A | | 4/1991 | Mathur | |
|---|---|---|---|---|---|
| 5,155,847 | A | * | 10/1992 | Kirouac et al. | 709/221 |
| 5,764,992 | A | * | 6/1998 | Kullick et al. | 717/170 |
| 6,052,531 | A | * | 4/2000 | Waldin et al. | 717/170 |
| 6,167,567 | A | * | 12/2000 | Chiles et al. | 717/173 |
| 6,347,398 | B1 | * | 2/2002 | Parthasarathy et al. | 717/178 |
| 6,360,366 | B1 | * | 3/2002 | Heath et al. | 717/178 |
| 6,453,468 | B1 | * | 9/2002 | D'Souza | 717/168 |
| 6,463,584 | B1 | * | 10/2002 | Gard et al. | 717/171 |
| 6,523,166 | B1 | * | 2/2003 | Mishra et al. | 717/174 |

FOREIGN PATENT DOCUMENTS

| EP | 0 698 847 | 2/1996 |
|---|---|---|
| WO | WO 94/01819 | 1/1994 |

* cited by examiner

*Primary Examiner*—Meng-Al T. An
*Assistant Examiner*—Michael Yaary
(74) *Attorney, Agent, or Firm*—Bell, Boyd & Lloyd

(57) ABSTRACT

The invention relates to a method for replacing old software (10) that is in use with new software (12), which permits the maximum availability of the software. Said method is subdivided into a preparation phase (V) and an active phase (A). The preparation phase (V) take place during the operation of the old software (10). The active phase (A) is merely characterized by the execution of a MOVE command.

14 Claims, 2 Drawing Sheets

TIME OPTIMIZED REPLACEMENT OF A SOFTWARE APPLICATION

BACKGROUND OF THE INVENTION

The present invention relates to a method for performing a status change on at least one computer from an actual condition to a target condition, the status change relating in particular to replacement or first-time commissioning of software or of a software package.

The use of software is subject to continuous further development, with the result that applications that already exist and are in operation must be adapted to suit new requirements (e.g., increased hardware performance) or upgraded. Consequently, the existing application in use has to be replaced by a later version, an upgrade/update or with a corrected version (patch).

There are basically several ways of installing software on a computer. Formerly, a set of diskettes was used, the first diskette generally containing a setup program and a compressed file. The decompressed file(s) is/are then copied to a destination directory on the target system. The setup program guides the user through the installation routine and can in some cases additionally modify certain configuration files of the target system.

Today, a CD can be used which enables a similar procedure to be followed and provides more storage space.

Additionally known is the use of shells which automatically extract an associated file tree and store it in a selectable directory. If software is not to be installed for the first time, but already installed software is to be reinstalled, there are basically two options:

1. After deinstalling the old package, the new package is completely reinstalled. The advantage of this method is that all the newly installed files also have de facto the same version, and errors due to erroneously unchanged files can be eliminated. The major disadvantage of this method is that it is very time-consuming.

2. No deinstallation takes place, but only the parts that are different in the new version are reinstalled. Although this is faster, the swapping of data between the old and new files often results in errors.

All the known installation techniques are certainly very time-intensive and require a lengthy period during which neither the old nor the new software can be run.

For particularly time-critical applications, such as in the telecommunications and database fields, time-optimized replacement of application software is indispensable in order not to disrupt operation of the entire system.

With regard to the abovementioned areas of use which require virtually continuous coverage of the application, it is unacceptable for the application to be inoperable for a lengthy period due to the necessary software replacement.

A highly time-optimized status change is not only critical for software replacement, however, but also applies if certain system variables are to be changed or if certain peripherals and/or hardware components are to be replaced by others, with the result that, for example, the use of other drivers becomes necessary. Basically, time-optimized replacement is necessary if other processes are using the current software to be replaced.

To date, the status in terms of software replacement has been implemented by taking the existing software out of operation, replacing it by installing new software and then re-starting the application and/or the system.

This method has been found to be very disadvantageous for the time-optimization reasons described above; the method for replacing software has until now been adopted from the general use of application software in other areas which have a much greater time tolerance. If, for example, a drawing program is to be replaced by a new version of the same, a brief unavailability of the application would be acceptable. However, this is not the case in the telecommunications field, particularly for carrier-grade systems, as these require maximum availability.

An object of the present invention is, therefore, to create a method allowing a time-optimized status change, in particular a time-optimized replacement of software applications, and one which can be automated. The object is, in particular, to create a method for replacing applications on individual computers in a multi-computer network.

SUMMARY OF THE INVENTION

Such object is achieved by the method described above which is subdivided into a preparation phase and a subsequent active phase, the preparation phase being carried out in the actual condition and including the following steps:
  registering control information relating to the target condition;
  automatically generating at least one script from the control information;
  saving the data for the target condition to an intermediate (cache) directory;
  and wherein the status change is performed during the active phase by terminating operation in the actual condition and applying the script to make the data for the target condition available in a destination directory without all the data for the target condition having to be physically moved.

Such object is achieved in particular, in that no physical movement of the data takes place in the active phase; specifically, no movement of the entire software package with its associated directory tree.

In contrast to the current method of status change and software replacement adopted from other areas of installation, it has been found to be very advantageous for the availability of the relevant software that the time required for the status change can be significantly reduced. This is achieved by subdividing the area of software installation into two phases: a preparation phase executed while the actual condition still occurs; i.e., during operation of the old software or during operation without the new software being installed. The second phase, a so-called active phase, is used for direct execution of the status change without data transfer being necessary. By bringing forward the preparation phase, the time-critical active phase can be limited to the execution of only one or more move instructions, after termination of the actual condition and to initiate the target condition. Therefore, by bringing forward significant parts of the installation process, such as loading operations and processes for generating the appropriate environment, the time to the start of the target condition and also the shutdown time can be minimized. It is the latter that is of particular importance, as the period of inactivity of already installed software that is to be replaced by an upgrade, an update or a patch should be as brief as possible.

This results in significantly improved downtimes of the software employed, particularly in the area of applications for network operators and service providers.

A further advantage also lies in the automatability of the method, particularly in that time-optimized scripts can be generated automatically and in the generation of the associated environment for the software in the target condition or for the current version of the software. This is made possible by subjecting the actual condition to analysis in which certain system parameters (e.g., environment variables) are automatically registered. Dynamically adapted, automatic installation can then take place, as the scripts for performing the installation take the registered system parameters into account. To date, dynamically adapted installation method has been unknown and is advantageous not merely for time reasons, as the necessary interactive entry of information does not allow a time-optimized method.

This also results in less proneness to errors than in the present systems, as the automatically produced path names are generated faultlessly and coincide with the corresponding directories. Errors have arisen, for example, due to the fact that when upgrading an application on a Windows system, parts or areas of the operating system (e.g., the DLL files), are modified by installation of the application software. This can give rise to a situation in which DLL files exist in the old version and in the new version. However, no tracing for the overwriting of DLL files takes place. With a sequence of installations and deinstallations, incongruities can then arise.

In the preferred embodiments of the present invention, the method for performing a status change is applied to computers used in the area of carrier-grade systems in the telecommunications field.

A particularly advantageous embodiment of the present invention relates to cluster computers. To increase computing power and advantageously influence other system parameters, clusters are often used; e.g., a group of networked computers that are assigned the same task. So-called standby clusters or availability clusters are used in order to be able (as the name suggests) to optimize the availability of a system. For example, the cluster could consist of two machines, one of which performs a specific task assigned to it. The other machine is in standby mode. Only if the first machine indicates that problems are occurring (e.g., a hardware defect or a software fault) will the second machine take over the jobs of the first. (No load sharing occurs). As such, there is an inactive or standby condition of a machine or, in other concepts, of a network of machines.

This standby condition, the so-called cluster redundancy, is used in such a way with the present invention that the status change only affects the inactive side of the cluster, enabling availability to be increased still further.

In a further advantageous embodiment of the present invention, "UNIX" is used as the operating system. This move instruction is then executed by the use of one or a sequence of MOVE commands.

The MOVE command is therefore time-optimized, as no data is moved, but only the top entry in the corresponding directory tree, the so-called inode entry, is modified or redirected. As all the necessary arrangements have been made in the preparation phase, only the MOVE command still has to be executed in the active phase using the method according to the present invention.

It has been found to be extremely advantageous that the environment for the relevant application can be automatically generated using the method according to the present invention. For this purpose the software for the target condition is stored under automatically generated path names. The advantage of this is that the corresponding and correctly configured environment is activated automatically when the target condition is put into operation.

The inventiveness is particularly evident in that an installation script is generated automatically and above all dynamically; the new package is augmented with specific target system information, so that optimized and in particular time-optimized installation on the relevant target system is possible without further system parameters having to be requested and/or processed during the installation. The time optimization of the status change, particularly of software replacement, is therefore based according to the present invention on the concept that the software to be installed does not need to be moved during the active phase.

Additional features and advantages of the present invention are described in, and will be apparent from, the following Detailed Description of the Invention and the Figures.

DETAILED DESCRIPTION OF THE INVENTION

The method is geared to replacing old software 10 that is in use with new software 12 that is to be installed for the first time or re-installed.

The new software can be an update, an upgrade or a patch of the old software 10. However, it is also possible that the new software 12 to be installed has not yet been installed and a first-time installation is to be achieved by the status change.

The method according to the present invention is characterized by two directly consecutive phases: in a preparation phase V, all the processes are executed which can be brought forward in time and can take place while the old software 10 is still in operation. In an active phase A, the replacement process is completed by relocating certain files and directories only. The active phase A ends with startup of the new software 12.

Figure 1A:
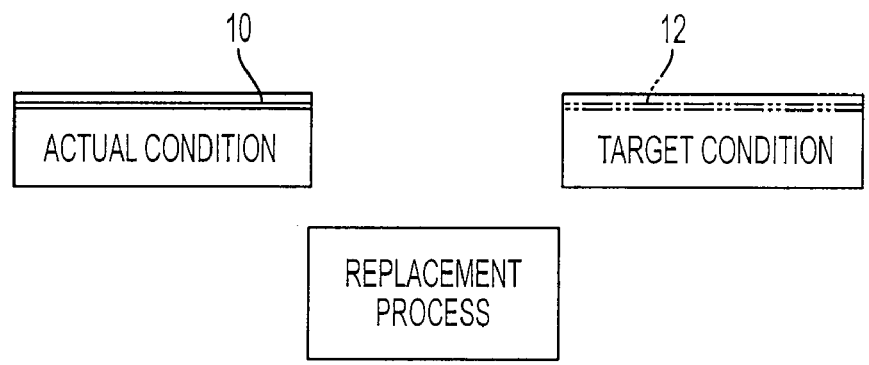
FIG. 1a is a schematic representation of a status change according to the prior art.
Figure 1B:
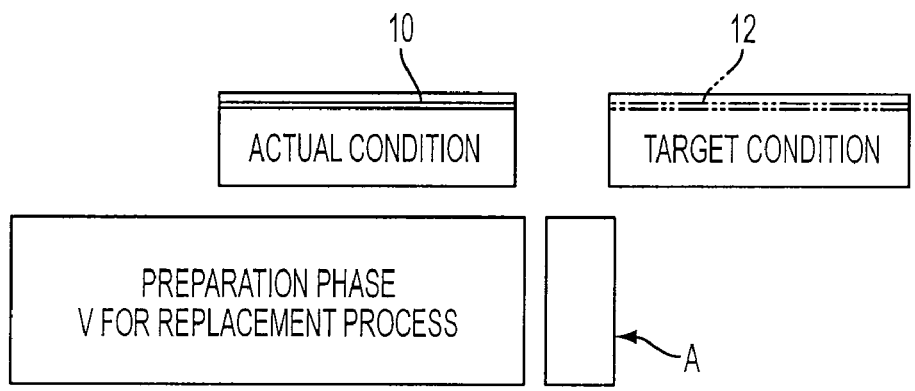
FIG. 1b is a schematic representation of a status change according to the present invention.

FIGS. 1a and 1b refer to the change from actual to target condition. FIG. 1a illustrates a software change according to a method from the prior art and FIG. 1b relates to the method according to the present invention which is subdivided into the preparation phase V and the active phase A.

By replacing or changing a program, a status change of the computer or system (of computers) is achieved. An actual condition 16 is characterized by operation of the old software 10. This actual condition 16 is to be transformed into a target condition 18 characterized by operation of the new software 12. By using the method according to the present invention, the time for the status change (i.e., the time between shutdown of operation of the old software 10 and startup of the new software 12) is minimized.

In a preferred embodiment, the software is to be replaced on a computer of a SUN cluster 2.2.

To increase the availability of the software application, the cluster redundancy is utilized by performing the status change on the inactive side of the cluster only, without interrupting software operation on the active side.

The rough time sequence of an advantageous embodiment of the method according to the present invention in respect of a UNIX computer will now be explained with reference to FIG. 2.

Figure 2:
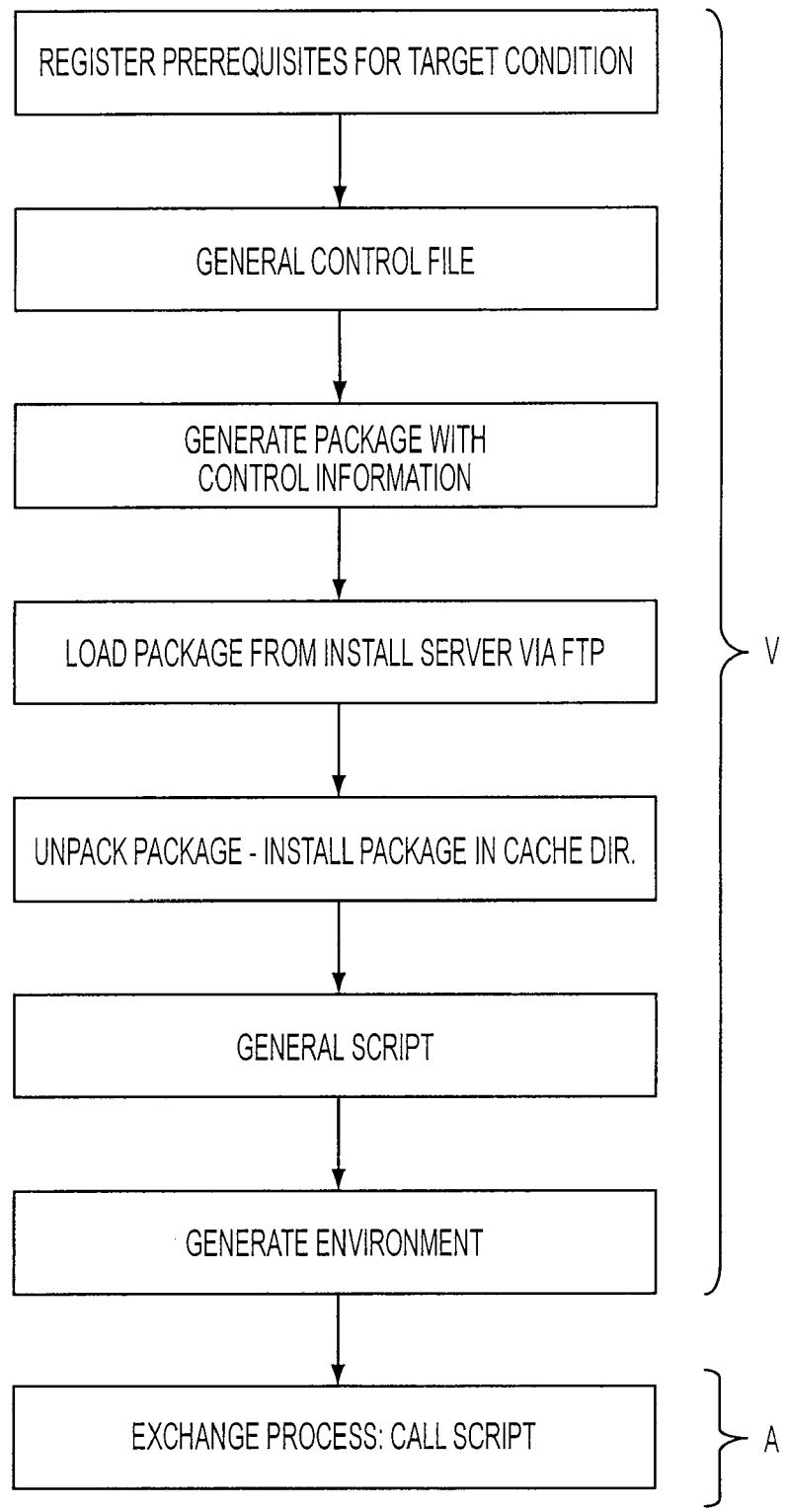
FIG. 2 shows a flowchart for performing the status change according to the present invention.

In this connection it should be noted that other embodiments of the present present invention provide a modified sequence of the individual procedural steps shown in FIG. 2, the steps illustrated in the first three boxes taking place in the software production phase and the remaining (five) steps being executed on the target machine.

To initiate the method, all the prerequisites for bringing about the target condition, particularly of the new software 12, are registered as shown in FIG. 2. During development or production of the software package, a so-called control file 20 is created in which control information 22 is stored.

The control information 22 is packed together with the new software 12 into a package 24 according to the known method from the prior art.

The control information relates, for example, to the required system reaction during or after performance of the status change. It may be required, for example, that no system reaction shall take place after installation of the new software 12, or shutdown of the application or shutdown of the application including the basic software may be required, namely of the intermediate layer between the application and the operating system. Alternatively it can be specified that a complete reboot shall take place.

The control information 22 of the package 24 is still used in the preparation phase V in order to generate one or more scripts 26. These scripts 26 cause the replacement action to be executed in a time-optimized manner.

In addition, the new software 12 is stored under automatically generated directory names which are used as a cache directory. A dynamic assignment between the directory names and environment variables of the software package then takes place.

The UNIX operating system provides the administrator with clearly defined routines, such as the "package add" (pkgadd) and "package remove" (pkgrm) routines which add a package or remove software from a system as their names suggest. The format for UNIX software packages is defined among other things by an "Application Binary Interface" (ABI).

To summarize, in the preparation phase V all the time-intensive commands are executed in the background of current system operation in a cache directory (in FIG. 2 the term "cache directory" in the fifth step has been abbreviated to "cache dir."). Thus when the new software 12 has been unpacked, it is installed in the cache directory—using, for example, the "pkgadd" command. Scripts 26 are then generated for subsequently performing the replacement of the old software 10 with the new software 12—from the pkgadd control file "pkgmap", for example. Then the environment for the new software 12 is automatically generated.

Only then is it necessary to shut down the old software 10, particularly the network operator software. This point in time also defines the transition from the preparation phase V to the active phase A. After shutdown of the old software 10, the scripts 26 are now in turn executed, depending on the embodiment selected, by executing a MOVE command or a sequence of MOVE commands.

Because of the preliminary steps in the preparation phase V, the execution of a MOVE command or of a sequence of MOVE commands is now necessary at this point in order to have the information stored in the cache directory available in the destination directory. After execution of this operation, the new software 12 is put into operation, the target condition 18 is attained and the active phase A is complete.

By executing the preparatory and time-intensive steps in the preparation phase V, the active phase A can be reduced to a minimal time period, which considerably increases system availability. Execution of the time-intensive commands takes place in the preparation phase V; i.e., in parallel with the operation (of the old software 10) in the actual condition 16. This period of time during the preparation phase V can therefore be totally disregarded in terms of the non-availability of the system. As the present invention is based not least on the fact that during the actual condition 16 as many installation process as possible are brought forward, the preparation phase V can occupy a longer period of time than would be the case for a method according to the prior art. This does not impair availability, however, as the old software 10 still continues to run during the actual condition 16. The system is only unavailable during the minimally short active phase A.

The time benefit according to the present invention therefore results from using a MOVE command or a sequence of MOVE commands, which only change the root of the file tree, the INODE, and do not move data. This is the difference between re-installation according to the present invention and that known in the prior art in which a complete copy of the data is generated.

An alternative embodiment of the present invention provides for the use of the method for non-UNIX systems and/or non-cluster systems.

The method according to the present invention additionally includes further options for performing the replacement process. For example, it can be specified whether a system reaction is required after incorporation of the new software 12 (for example a reboot, etc.). In addition, the necessary processes can be defined that are necessary prior to unpacking of the new software 12 and/or after incorporation of the new software 12 in the destination directory but before restarting the new software 12. This includes processes such as necessary data conversions, link generation or the like. In addition, the environment which is to be automatically activated in the target condition 18 can be set.

An important advantage in practice is that the environment of the new software 12 to be installed is generated automatically. The user does not therefore need to be concerned with selecting the correct installation package and the method can operate on a fully automated basis.

In order not to lose the operable old software 10 (i.e., the actual condition 16 prior to the replacement action), in the event of a mis-controlled replacement action, there is additionally provided a fall-back option involving a back-replacement of the software. This means that the old actual condition corresponds to the new target condition and vice versa. For this purpose the old software 10 to be replaced is saved to a backout directory. From this directory it is then moved again to the destination directory. This additional backup measure ensures that no data can be lost.

However, the method is frequently used to cause a patch for the software application to be installed automatically. The correction program, the so-called patch, can therefore be automatically installed in the relevant version and with the appropriate environment.

Although the present invention has been described with reference to specific embodiments, those of skill in the art will recognize that changes may be made thereto without departing from the spirit and scope of the present invention as set forth in the hereafter appended claims.

The invention claimed is:

1. A method for performing a status change on at least one computer, wherein the computer is a computer within a cluster, from an actual condition to a target condition, the status change relating to one of replacement and initial operation of software, the method comprising the steps of:

subdividing the method into a preparation phase and a subsequent active phase, wherein the preparation phase is executed during operation of the actual condition and the status change is effected during the active phase, wherein the preparation phase includes:

registering control information relating to the target condition;

automatically generating at least one script from the control information; and saving data for the target condition to a cache directory; and wherein the active phase includes:

terminating operation in the actual condition; and applying the script via which the data for the target condition is relocated from the cache directory to a destination directory, wherein execution of the script is time-optimized.

2. A method for performing a status change as claimed in claim 1, wherein an appropriate environment for the target condition is automatically generated.

3. A method for performing a status change as claimed in claim 1, wherein the data for the target condition is stored, during the preparation phase, under automatically generated path names.

4. A method for performing a status change as claimed in claim 1, wherein at least the active phase occurs on inactive sides of the cluster computers.

5. A method for performing a status change as claimed in claim 1, wherein the computer is a UNIX computer.

6. A method for performing a status change as claimed in claim 5, wherein upon completion of the active phase, the data for the target condition is no longer in the cache directory but is accessible in the destination directory by renaming a data tree route via a MOVE command.

7. A method for performing a status change as claimed in claim 1, the method further comprising the step of automatically restoring the actual condition after performing the status change by generating a backout package during installation of a package.

8. A method of performing a status change as claimed in claim 1, wherein the data for the target condition relates to a software package in which control information has been incorporated.

9. A method of performing a status change as claimed in claim 8, wherein the software package is unpacked in the cache directory.

10. A method of performing a status change as claimed in claim 1, wherein the status change involves installing new software for the first time.

11. A method of performing a status change as claimed in claim 1, wherein the status change involves re-installing old software, the re-installation involving at least one of an upgrade and an update.

12. A method of performing a status change as claimed in claim 1, wherein the status change involves installing a patch for old software.

13. A method of performing a status change as claimed in claim 1, wherein the status change is performed automatically.

14. A computer-readable storage medium having a program incorporating software code portions for performing, upon execution by a processor, a status change on at least one computer, wherein the at least one computer is a computer within a cluster, from an actual condition to a target condition, the status change relating to one of replacement and initial operation of software, with the program being subdivided into a preparation phase and a subsequent active phase, the software code portions comprising:

registering in the preparation phase and during the operation of the actual condition, control information relating to the target condition;

automatically generating, in the preparation phase, and during the actual condition, at least one script from the control information;

saving, in the preparation phase and during the actual condition, data for the target condition to a cache directory;

terminating, during the active phase, operation in the actual condition; and applying, during the active phase, the script via which the data for the target condition is relocated from the cache directory to a destination directory, wherein execution of the script is time-optimized.

* * * * *